(12) United States Patent
Aggarwal et al.

(10) Patent No.: US 10,726,003 B2
(45) Date of Patent: Jul. 28, 2020

(54) SIMULTANEOUS SEARCH ON MULTIPLE LIVING ROOM DEVICES

(71) Applicant: Caavo Inc, Santa Clara, CA (US)

(72) Inventors: Ashish D. Aggarwal, Stevenson Ranch, CA (US); Andrew E. Einaudi, San Francisco, CA (US); Nino V. Marino, Alameda, CA (US)

(73) Assignee: Caavo Inc, Milpitas, CA (US)

( * ) Notice: Subject to any disclaimer, the term of this patent is extended or adjusted under 35 U.S.C. 154(b) by 232 days.

(21) Appl. No.: 15/398,631

(22) Filed: Jan. 4, 2017

(65) Prior Publication Data

US 2017/0193035 A1  Jul. 6, 2017

Related U.S. Application Data

(60) Provisional application No. 62/275,008, filed on Jan. 5, 2016.

(51) Int. Cl.
*G06F 16/242* (2019.01)
*G06F 16/248* (2019.01)
*G06F 16/25* (2019.01)

(52) U.S. Cl.
CPC ........ *G06F 16/2423* (2019.01); *G06F 16/248* (2019.01); *G06F 16/252* (2019.01); *G06F 16/258* (2019.01)

(58) Field of Classification Search
CPC ......... G06F 17/30392; G06F 17/30554; G06F 3/04883; G06F 16/2423; G06F 16/258; G06F 16/248; G06F 16/252
See application file for complete search history.

(56) References Cited

U.S. PATENT DOCUMENTS

| | | | |
|---|---|---|---|
| 6,304,864 B1* | 10/2001 | Liddy | G06F 17/30867 706/15 |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |
| 2005/0198245 A1* | 9/2005 | Burgess | G06F 3/14 709/223 |

(Continued)

OTHER PUBLICATIONS

Windows 8.1: The Missing Manual, by David Pogue, Publisher: O'Reilly Media Inc., Release Date: Nov. 2013, ISBN: 9781449371623, chapter 7. (Year: 2013).*

(Continued)

*Primary Examiner* — Jay A Morrison
(74) *Attorney, Agent, or Firm* — Fiala & Weaver P.L.L.C.

(57) ABSTRACT

A unified search system is described herein. The unified search system is configured to enable, in a control device (e.g., a remote control), a user to input a search query. The unified search system includes a plurality of content providing device interfaces configured to interface the control device with a plurality of content providing devices. Each content providing device interface is configured to receive the search query from the user input interface, format the search query according to a corresponding input device type, and provide the formatted search query to one or more corresponding content providing devices. Search results received from the content providing devices are displayed at a display of the control device and/or at another display (e.g., a television).

20 Claims, 9 Drawing Sheets

(56) References Cited

U.S. PATENT DOCUMENTS

| | | | | |
|---|---|---|---|---|
| 2007/0130370 A1* | 6/2007 | Akaezuwa | ............ | G06F 16/951 |
| | | | | 710/1 |
| 2008/0238708 A1* | 10/2008 | Pittard | ................... | G08C 17/02 |
| | | | | 340/4.3 |
| 2012/0159372 A1* | 6/2012 | Stallings | .......... | H04N 21/42208 |
| | | | | 715/773 |
| 2015/0227588 A1* | 8/2015 | Shapira | ............. | G06F 17/30675 |
| | | | | 707/722 |
| 2015/0269369 A1* | 9/2015 | Hamid | .................... | G06F 21/31 |
| | | | | 726/5 |
| 2017/0140008 A1* | 5/2017 | Ramaswami | ..... | G06F 17/30528 |
| 2017/0201515 A1* | 7/2017 | Clark | ................. | H04L 63/0876 |

OTHER PUBLICATIONS

Plex-wide search in main NavBar, by iBaa et al., GitHub webpage, Apr. 21, 2015, https://github.com/iBaa/PlexConnect/commit/7d35c201d445fc422807c904418f8a9755289f35. (Year: 2015).*

* cited by examiner

802

Receive a plurality of search results from the content providing devices at a second control device

SIMULTANEOUS SEARCH ON MULTIPLE LIVING ROOM DEVICES

CROSS-REFERENCE TO RELATED APPLICATIONS

This application claims priority to U.S. Provisional Patent Application No. 62/275,008, filed Jan. 5, 2016 and entitled "Simultaneous Search on Multiple Living Room Devices," the entirety of which is incorporated by reference herein.

BACKGROUND

Technical Field

The subject matter described herein relates to content searching on devices.

Description of Related Art

Digital entertainment on television today is not limited to a satellite or cable set top box to watch movies or television (TV) shows. A host of alternatives called over-the-top (OTT) video streaming devices (e.g., Apple TV®, Roku®, Amazon Fire® TV, etc.) or game consoles (e.g., Microsoft® Xbox®, Sony® PlayStation®, etc.) are available to stream content on demand via an Internet connection to a TV. Each of these devices may execute one or more applications (e.g., Netflix®, Amazon Prime® Video, iTunes®, etc.) from different providers with a variety of content—some exclusive and some common across platforms. These devices are connected to the TV directly or via an AVR (audio-video receiver).

The connected devices provide a user interface on the TV screen that can be controlled using a remote control with the user sitting at some distance from the TV screen (e.g., 10 ft).

Each of the devices that provide content to a TV enables users to search for content. For example, a user may use a keypad on a remote control to type in characters of one or more search terms to submit to a content-providing device, and the content-providing device may execute a search based on the entered search terms. However, such a search is usually limited and narrow because each content-providing device focuses on its own content providers, and their individual database may not be large. Moreover, each content-providing device has a different way of searching the content, such as using voice search, text search, phone apps, web-based search, etc.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for enabling unified search across content-providing devices in a unified search system. The unified search system is configured to enable, in a control device (e.g., a remote control, a smart phone, a tablet computer, etc.), a user to input a search query. The unified search system includes in the control device a plurality of content providing device interfaces configured to interface the control device with a. plurality of content providing devices. Each content providing device interface is configured to receive the search query from the user input interface, format the search query according to a corresponding input device type, and provide the formatted search query to one or more corresponding content providing devices. Search results received from the content providing devices are displayed at a display of the control device and/or at another display (e.g., a television).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
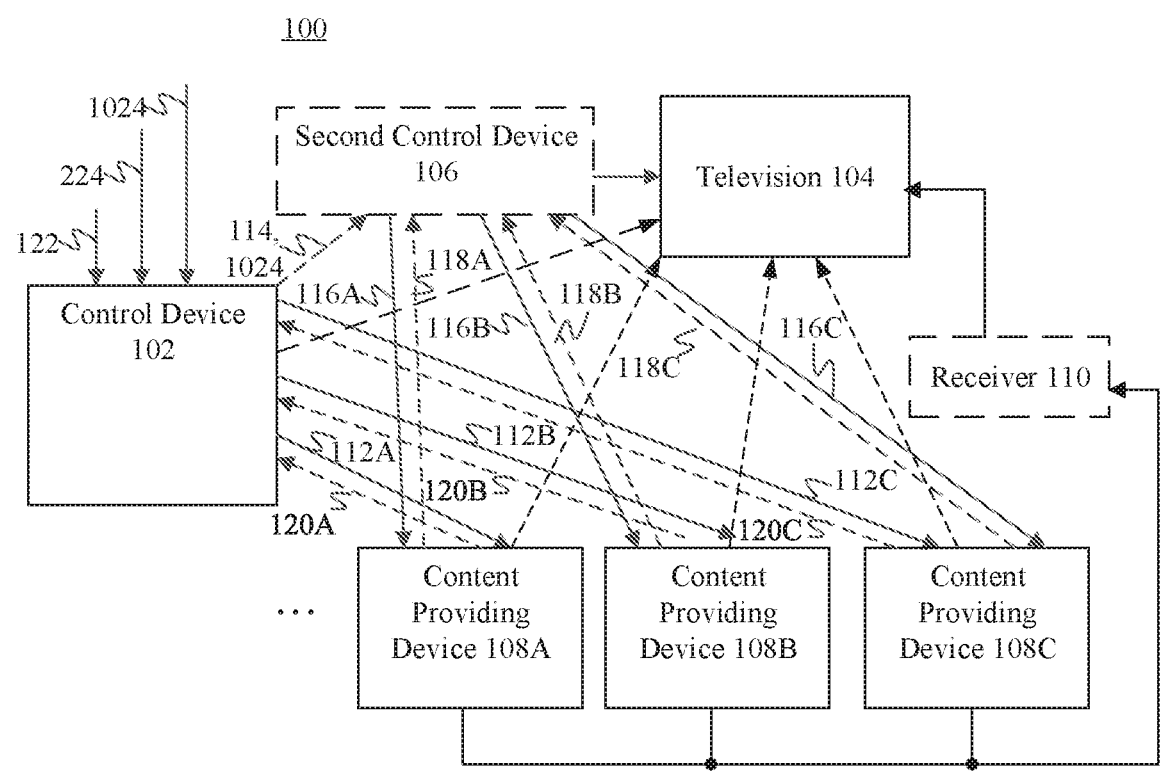
FIG. 1 shows a block diagram of a video system in which a control device is interacted with by a user to control the display of content at a television, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

Embodiments enable content searches to be performed across a plurality of different devices to generate search results covering the different devices. Furthermore, embodiments provide a unified way to present the search results to a user. Different devices each provide users with a way to provide search criteria (e.g., text input to the device or to a particular service running on that device). For example, Apple TV® allows a Bluetooth keyboard to enter characters while Roku® provides a way for an IP (Internet protocol) keyboard to enter text characters.

In embodiments, to perform one unified search across a plurality of content providing devices, a system is implemented in a control device to emulate multiple interfaces, including an interface corresponding to each of the content providing devices. For example, the system may include a first interface that emulates a Bluetooth keyboard compatible with Apple TV®, Sony® PlayStation®, and/or Amazon Fire® TV devices, while a second interface may emulate an IP keyboard for one or more other devices (e.g., Roku®). By emulating multiple interfaces at one time, a standard search query may be issued to all of the devices simultaneously (e.g., in parallel or in serial), and the resulting search results may be displayed.

The control device may be interacted with by a user to provide commands, queries, etc., in various ways, such by a text input, a voice command, etc. In an embodiment, a received voice command may be converted by a speech to text recognition system of the control device to generate text characters that may be sent to the content providing devices, thereby acting like a unified voice controlled system.

III. Example Embodiments with Primary Control Device as Interface with Content Providing Devices Various types of control devices may be used in embodiments, including handheld remote controls as well as stationary control devices. Examples of handheld remote controls include television remote controls, universal remotes, smart phones (e.g., operating a remote control application), tablet devices (e.g., operating a remote control application), and other control devices that can be held in a person's hand. Examples of stationary control devices include set-top boxes, satellite TV receiver boxes, control-enabled DVD players, and other control devices too large for easy portability by a human, and that are intended to operate in a stationary location. A control device may be used in a variety of environments where multiple content providing devices are coupled to a display to provide content to that display (e.g., a television) directly or indirectly (e.g., through a receiver or other switch).

For example, FIG. 1 shows a block diagram of a video system 100 where a (first) control device 102 is interacted with by a user to control the display of content at a television 104, according to an embodiment. Video system 100 includes control device 102, television 104, first-third content providing devices 108A-108C, and an optional receiver 110. As shown in FIG. 1, video system 100 can further include an optional second control device 106. Video system 100 is further described as follows.

As shown in FIG. 1, first-third content providing devices 108A-108C are each coupled to receiver 110, and receiver 110 is coupled to television 104. Such coupling between components may be wired, wireless, or a combination thereof. First-third content providing devices 108A-108C are each a content providing device, such a set-top box, a satellite TV receiver box, a DVD (digital video disc) player, an over-the-top (OTT) video streaming device (e.g., Apple TV®, Roku®, Amazon Fire® TV, etc.), a game console (e.g., Microsoft® Xbox®, Sony® PlayStation®, etc.), etc. First-third content providing devices 1084-108C may each provide content directly to television 104 or indirectly (e.g., through receiver 110). The video content provided by first-third content providing devices 108A-108C may have any form, including being HDMI (high definition media interface) video, or other type of video content. Note that although three content providing devices are shown included in system 100, other numbers of content providing devices may be present, including lesser or greater numbers.

Receiver 110 is an audio/video receiver (AVR), which is a component frequently present in a home theater system. Receiver 110 may be configured to receive audio and video signals from one or more content providing sources, and processing the audio signals to drive one or more loudspeakers (not shown in FIG. 1) and/or the video signals to drive a display (e.g., television 104). When present, receiver 110 may operate as a switch (e.g., an HDMI switch) that enables a user to select (via control device 102) which of first-third content providing devices 108A-108C provide content for display on television 104 at any one time.

In embodiments, a user may interact with control device 102 to input a search query 122 to first-third content providing devices 108A-108C. Search query 122 includes one or more words/search terms provided by the user to be applied in a search for content available at first-third content providing devices 108A-108C. As shown in FIG. 1. control device 102 receives search query 122 (from the user). According to embodiments, and described in detail hereinafter, control device 102 is configured to emulate an interface for communications with each of first-third content providing devices 108A-108C, which may be very different types of devices with correspondingly different communications protocols, to enable search query 122 to be sent to each one. In particular, control device 102 is configured to transmit search query 122 to each of first-third content providing devices 108A-108C as formatted search queries 112A-112C, respectively, in forms that are compatible with first-third content providing devices 108A-108C. First-third content providing devices 108A-108C each process the received search query against their own catalogs of content to generate search results 120A-120C, respectively. First-third content providing devices 108A-108C transmit search results 120A-120C, respectively, to be received by control device 102. Control device 102 is configured to provide each of search results 1204-120C to the user e.g., on a display of control device 102, or transmitted for display on television 104). Search results 120A-120C for the different content providing devices may be provided to the user in various ways, such as being displayed side by side, or by being displayed in a combined manner.

Note that in an alternative embodiment, and discussed in detail later, rather than search results 120A-120C being. received by control device 102, search results 120A-120C may be alternatively transmitted to and received by second control device 106 as search results 118A-118C. Second control device 106 may be any suitable type of device, including a stationary control device such as a set-top box, one of first-third content providing devices 108A-108C, a video game console, a special purpose device, or television 104 itself. When receiving search results 118A-118C, second control device 106 is configured to provide search results 118A-118C to the user (e.g., on a display of second control device 106, or displayed on television 104).

Figure 2:
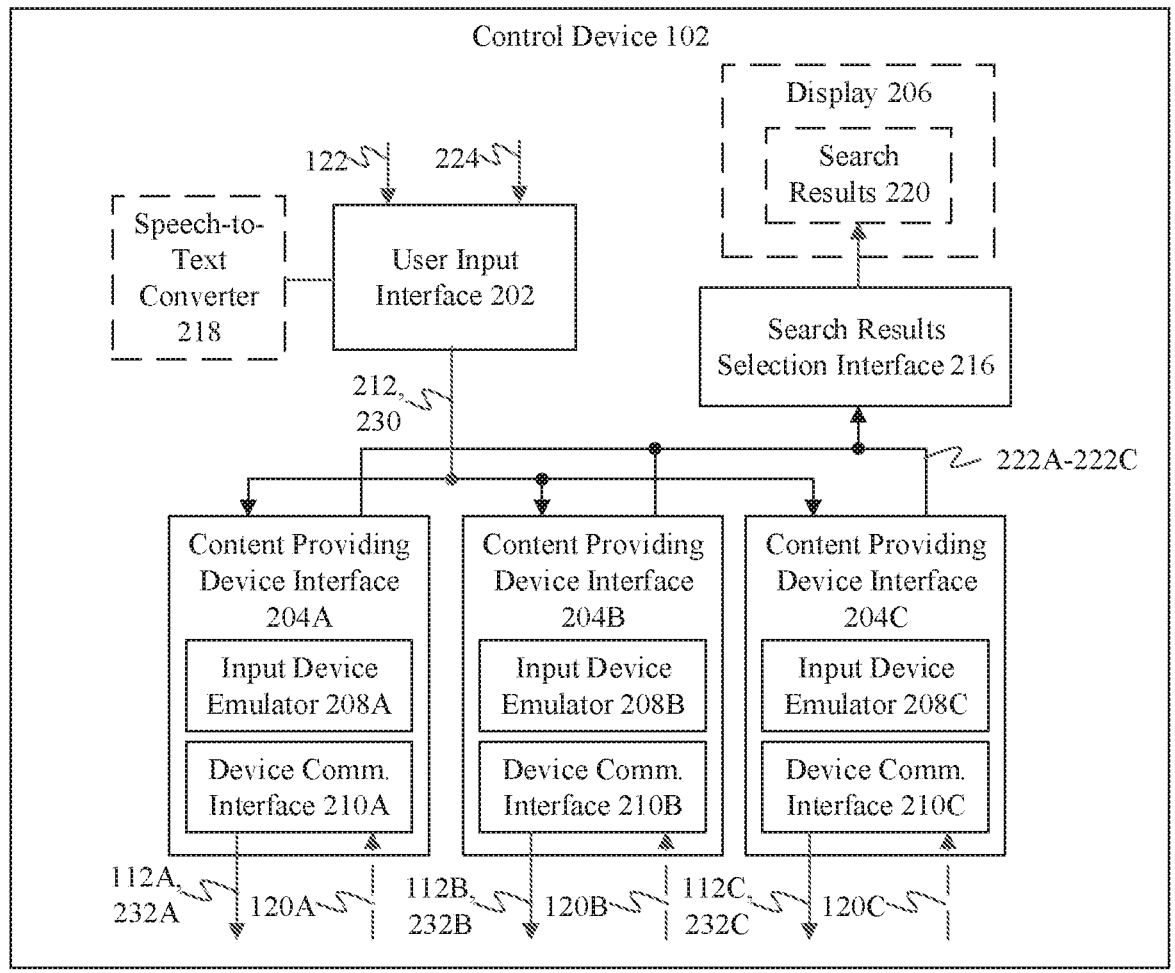
FIG. 2 shows a block diagram of a control device according to an example embodiment.

Control device 102 may be configured in various ways to perform its functions. For instance, FIG. 2 shows a block diagram of control device 102 according to an example embodiment. As shown in FIG, 2, control device 102 includes a user input interface 202, first-third content providing device interfaces 204A-204C, an optional display 206, a search results selection interface 216, and an optional speech-to-text converter 218. First content providing device interface 204A includes an input device emulator 208A and a device communication interface 210A. Second content providing device interface 204B includes an input device emulator 208B and a device communication interface 210B. Third content providing device interface 204C includes an input device emulator 208C and a device communication interface 210C. Control device 102 of FIG. 2 is described as follows.

Display 206 is a display screen of control device 102. Display 206 may be any type of display screen, including an LCD (liquid crystal display) or other type. In an embodiment where search results or content (from a content providing device) is provided to the user through control device 102 instead of television 104, the search results or content may be displayed by display 206.

User input interface 202 is configured to enable a user to input search query 122 to control device 102. For example, in an embodiment, user input interface 202 includes any number and combination of user interface elements, such as a keyboard, a thumb wheel, a pointing device, a roller ball, a stick pointer, any number of virtual interface elements (e.g., such as a keyboard or other user interface element displayed by display 206), and/or other user interface elements described elsewhere herein or otherwise known. In an embodiment, display 206 may be a touch sensitive display, and may display one or more UI elements of user input interface 202. As shown in FIG. 2, user input interface 202 provides search query 122 to first-third content providing device interfaces 204A-204C as search query 212.

As described further below, first-third content providing device interfaces 204A-204C are each configured as a communication interface with one or more content providing devices (e.g., first-third content providing devices 108A-108C of FIG. 1). First-third content providing device interfaces 204A-204C may each communicate with the content providing devices in a wireless or wired manner. First-third content providing device interfaces 204A-204C enable search queries provided to user input interface 202 to be provided to the corresponding content providing devices 108A-108C in a format/protocol the particular content providing device can handle. Note that although three content providing device interfaces are shown included in control device 202 in FIG. 2, other numbers of content providing device interfaces may be present, including lesser or greater numbers, depending on the number of different communication techniques desired for communicating with content providing devices.

In particular, input device emulators 208A-208C are each configured to emulate a corresponding input device type by formatting search query 212 according to the corresponding input device type (e.g., a game controller, a wireless keyboard, device-specific remote control, etc.). Input device emulators 208A-208C each format search query 212 such that it appears to the destination content providing device that the formatted search query came from a compatible input device (e.g., game controller, wireless keyboard, device-specific remote control, etc.). Device communication interfaces 210A-210C are each configured to receive the formatted search query from the corresponding one of the corresponding one of input device emulators 208A-208C, and to transmit the formatted search query to the corresponding one of content providing devices 108A-108C as formatted search queries 112A-112C, respectively. Device communication interfaces 210A-210C each transmit respective formatted search queries 112A-112C according to a communication protocol/technique (e.g., Bluetooth, Wi-Fi, proprietary communication protocol/technique, etc.) compatible with the corresponding one of content providing devices 108A-108C.

Furthermore, device communication interfaces 210A-210C are each configured to receive search results 120A-120C from the corresponding one of content providing devices 108A-108C (according to the applicable communication protocol/technique), to extract the search results from the received signal, and to output the extracted search results as search results 222A-222C, internally to control device 102 (e.g., all at once, or as they are received by interfaces 210A-210C). Search results selection interface 216 receives search results 222A-222C, and displays search results 222A-222C as search results 220 in display 206 to the user of control device 102. Note that in an embodiment, search results selection interface 216 may include logic configured to organize search results 220, including filtering search results 220 (e.g., according to user preferences or selection, or otherwise), ordering search results 220 (e.g., alphabetically, by content providing device, etc.), condensing search results 220, etc. Alternatively, search results selection interface 216 may send search results 220 to the electronic visual display for display to the user.

Control device 102 is further configured to allow the user to select a search result from plurality of search results 220 displayed to the user. In particular, the user may interact with user input interface 202 (e.g., selecting from a displayed list using touch, using arrow and select keys, etc.) to input selected search result 224. Selected search result 224 may be forwarded to content providing device interfaces 204A-204C as selected search result 230, and transmitted as one of selected search results 232A-232C to the one of content providing device 108A-108C having the content corresponding to selected search result 224. As a result, the particular content providing device 108A-108C may transmit the selected content to the electronic visual display of television 104 or other device for display to the user.

Speech-to-text converter 218, when present, is configured to convert speech (voice) received from a user by control device 102 (e.g., by a microphone of user input interface 202) into text. For example, speech-to-text converter 218 may implement techniques for speech-to-text conversion known to persons skilled in the relevant art(s). In embodiments, the received speech may include a search query, voice commands for controlling any device of a video system (e.g., television 104, receiver 110, and/or any other device shown in FIG. 1), a voiced selection of a displayed search result from a list of displayed search results, and/or other words/commands.

Figure 3:
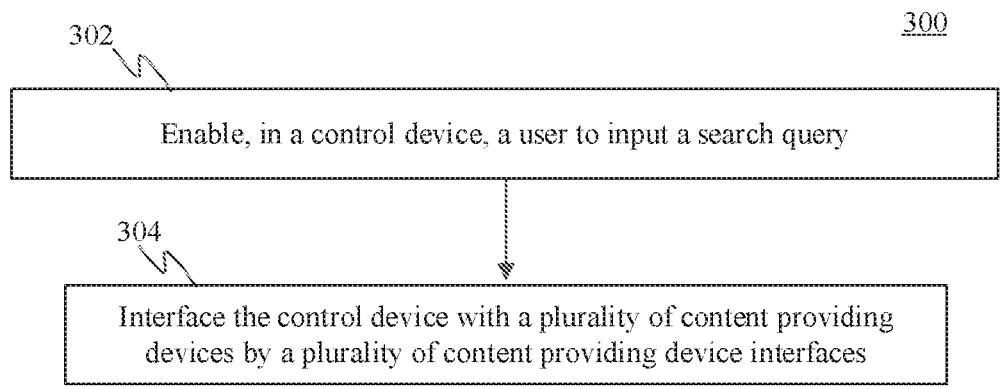
FIG. 3 shows a flowchart for a unified search across multiple content providing device, according to an example embodiment.

Control device 102 of FIG. 2 is described in further detail as follows with respect to FIG. 3. FIG. 3 shows a flowchart 300 for unified search across multiple content providing devices, according to an example embodiment. In an embodiment, control device 202 of FIG. 2 may operate according to flowchart 300. Further structural and operational embodiments will be apparent to persons skilled in the relevant art(s) based on the discussion regarding flowchart 300. Flowchart 300 is described as follows.

Flowchart 300 begins with step 302. In step 302, in a control device, a user is enabled to input a search query. For example, as described above, user input interface 202 may receive one or more search query terms from a user that form a search query. The search query term(s) may be provided by the user in the form of text, voice, and/or other form.

Figure 4:
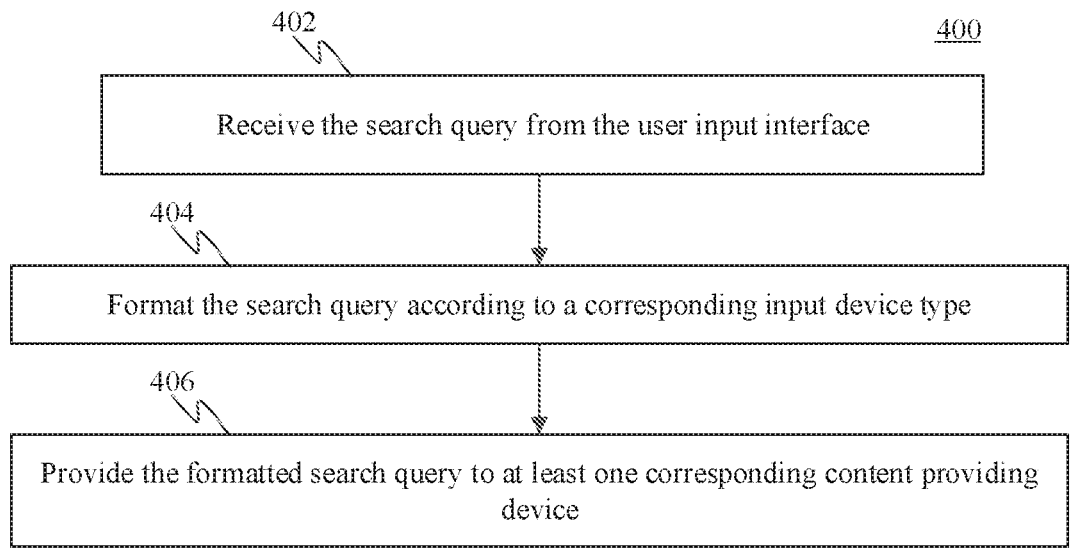
FIG. 4 shows a flowchart for interfacing with a content providing device, according to an example embodiment.

In step 304, the control device is interfaced with a plurality of content providing devices by a plurality of content providing device interfaces. For instance, as described above, first-third content providing device interfaces 204A-204C are each configured to interface with one or more content providing devices (e.g., first-third content providing devices 108A-108C of FIG. 1). In an embodiment, the content providing device interfaces may be configured to operate according to FIG. 4. FIG. 4 shows a flowchart 400 for interfacing with a content providing device, according to an example embodiment Flowchart 400 is described as follows.

Flowchart 400 begins with step 402. In step 402, the search query is received from the user input interface. For example, in an embodiment, user input interface 202 may receive search query 122 from the user, and provide search query 122 as search query 212 to each of first-third content providing device interfaces 204A-204C.

In step 404, the search query is formatted according to a corresponding input device type. As shown in FIG. 2, each of content providing device interfaces 204A-204C includes a corresponding one of input device emulators 208A-208C. An input device emulator is configured to emulate a corresponding input device type by formatting search query 212 according to the corresponding input device type (e.g., a game controller, a wireless keyboard, a mouse pointer, etc.).

For instance, in one example, content providing device interface 204A may be configured to interface with a Sony® PlayStation®. As such, input device emulator 208A may be configured to emulate a Bluetooth keyboard, which are allowed to provide textual characters to be provided to a Sony® PlayStation®. Accordingly, input device emulator 208A may be configured to format search query 212 according to the corresponding input device type—a Bluetooth keyboard—to generate Bluetooth keyboard formatted text data.

In another example, content providing device interface 204B may be configured to interface with a Roku®. As such, input device emulator 208B may be configured to emulate an IP keyboard, which are allowed to provide textual characters to be provided to a Roku® device. Accordingly, input device emulator 208B may be configured to format search query 212 according to the corresponding input device type—an IP keyboard—to generate IP keyboard formatted text data.

In step 406, the formatted search query is provided to at least one corresponding content providing device. As shown in FIG. 2, each of content providing device interfaces 204A-204C includes a corresponding one of device communication interfaces 210A-210C. A device communication interface is configured to interface with one or more content providing devices, and to provide formatted search query 112A-112C, formatted according to the corresponding input device type, to the corresponding one or more content providing devices as described above.

For instance, in the example where content providing device interface 204A interfaces with a Sony® PlayStation®, device communication interface 210A may provide the Bluetooth keyboard formatted text data generated by input device emulator 208A to a Sony® PlayStation® in video system 100 (e.g., content providing device 108A of FIG. 1) according to a Bluetooth protocol. In the example where content providing device interface 204B interfaces with a Roku®, device communication interface 210B may provide the IP keyboard formatted text data generated by input device emulator 208B to a Roku® in video system 100 (e.g., content providing device 108B of FIG. 1) according to an IP protocol.

Figure 5:
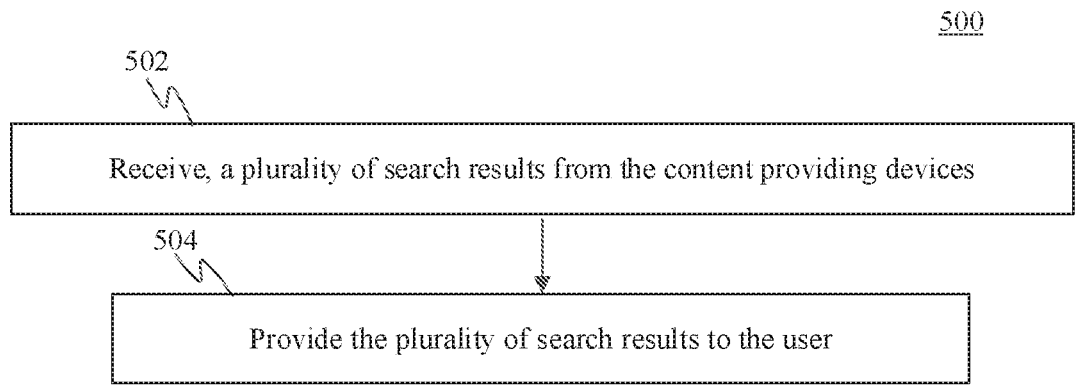
FIG. 5 shows a flowchart for receiving search results from content providing devices, according to an example embodiment.

After flowcharts 300 and 400, the content providing devices in the video system may each process the search query to generate respective search results. For instance, FIG. 5 shows a flowchart 500 that provides a process receiving search results from content providing devices, according to an example embodiment. Flowchart 500 may be performed by control device 102 or second control device 106. Flowchart 500 is described as follows.

Flowchart 500 begins with step 502. In step 502, a plurality of search results from the content providing devices is received. For example, as shown in FIG. 1, first-third content providing devices 108A-108C each generate search results that are transmitted to, and received by either control device 102 or second control device 106. With reference to FIG. 2, each content providing device's search results may be received by the corresponding device communication interfaces 210A-210C as search results 120A-120C.

In step 504, the plurality of search results is provided to the user. As shown in FIG. 2 and described above, search results selection interface 216 of control device 102, is configured to receive and provide the search results 220 to the user of control device 102 as a collection of search results 120A-120C, such as by displaying search results 120 in display 206. Alternatively, search results selection interface 216 may transmit search results 120 for display on another electronic display screen, such as television 104. As described above, search results selection interface 216 may include logic configured to organize the search results, including filtering the search results, ordering the search results, condensing the search results, etc. Any type of organizing may be performed.

For instance, in one embodiment where search results selection interface 216 organizes search results, each item of content may be listed once, with each content providing device that has the same item of content available for play being indicated next to the content item. For example, the search query entered by the user may be "Star Wars®," which may result in several content providing devices indicating the movie is available for play. However, by listing the content item a single time (instead of once for each content providing device), the user is saved time that would otherwise be spent perusing lengthier search results listing the content item multiple times.

Figure 6:
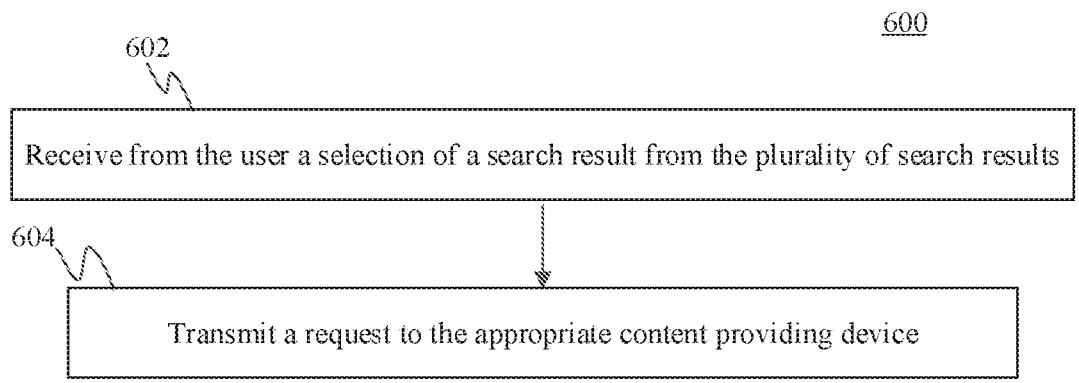
FIG. 6 shows a flowchart for processing a search result selection input by a user, according to an example embodiment.

In an embodiment, the user may make a selection from search results 220. For instance, FIG. 6 shows a flowchart 600 for processing a search result selection input by a user, according to an example embodiment. Flowchart 600 is described as follows.

Flowchart 600 begins with step 602. In step 602, the user may make the selection from search results 220. As shown in FIG. 2 and in an embodiment, user input interface 202 is configured to receive selected search result 224 from the user of control device 102 as a selection from search results 220 (displayed by display 206, television 104, or elsewhere). Selected search result 224 may be selected via a button, a microphone, or any other user interface element.

In step 604, a request for content is transmitted to the appropriate content providing device. As shown in FIG. 2 and described above, user input interface 202 is configured to transmit selected search result 224 as one of selected search results 232A-232C to the appropriate one of content providing device 108A-108C via the corresponding content providing device interface 204A-204C.

Subsequent to flowchart 500, the content corresponding to the request is transmitted from the appropriate content providing device to an electronic visual display for display to the user, which may be display 206 of FIG. 2, television 104 of FIG. 1, or other electronic display screen.

Figure 7:
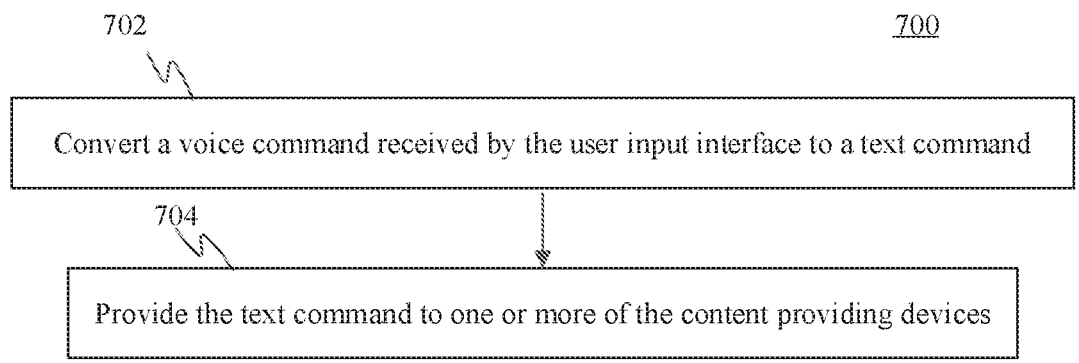
FIG. 7 shows a flowchart for controlling devices by voice commands, according to an example embodiment.

As described above, speech-to-text converter 218 may be present convert speech received by control device 102 (e.g., by a microphone) from a user into text. In an embodiment, control device 102 (including speech-to-text converter 218) may operate according to FIG. 7. FIG. 7 shows a flowchart 700 for controlling devices by voice commands, according to an example embodiment. Flowchart 700 is described as follows.

Flowchart 700 begins with step 702. In step 702, a voice command received by the user input interface is converted to a text command. In an embodiment, speech received at control device 102 via a microphone may be digitized and provided to speech-to-text converter 218. Speech-to-text converter 218 is configured to analyze the digitized speech, in order to convert the received speech to text (one or more characters/words). The text may include a command provided to control device 102 by the user, by voice, that is intended to control one or more of the devices in the video system. Any suitable voice command may be received. For instance, a voice command may be configured to turn on a device, turn off a device, change a channel, change volume, change a content providing device that is providing content for display by display 206, select content, move forward or backward in content, delete content, record content, select an item in search results, etc.

In step 704, the text command is provided to one or more of the content providing devices. In an embodiment, speech-to-text converter 218 may output the text command to one or more of content providing device interfaces 204A-204C that interface with the one or more devices intended to be controlled. The one or more content providing device interfaces 204A-204C format and transmit the text command to the one or more devices intended to be controlled, which in turn perform the commanded function(s).

Figures 8, 9:
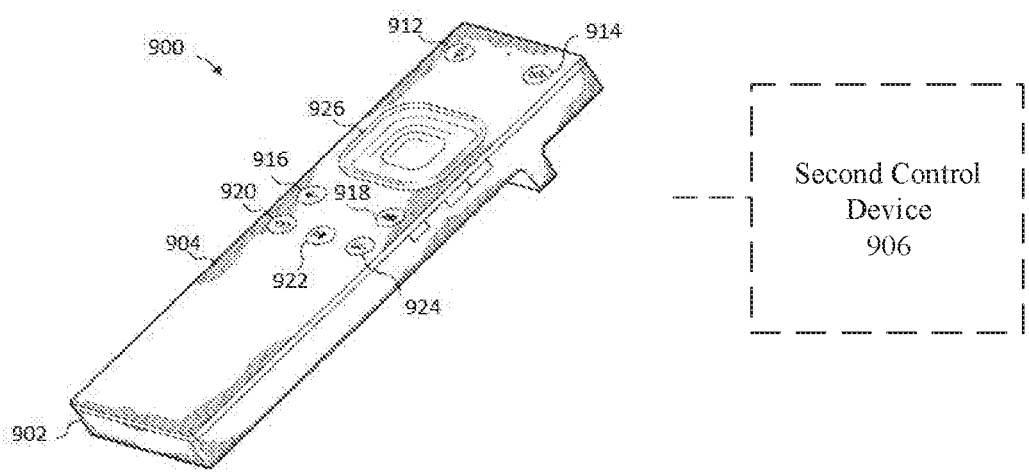
FIG. 8 shows a flowchart for interfacing with a second control device, according to an example embodiment.
FIG. 9 shows a block diagram of an example control device in accordance with an embodiment.

In an embodiment, after flowcharts 300 and 400, the content providing devices in the video system may each process the search query to generate respective search results, and rather than transmitting the search results as search results 120A-120C to control device 102, the content providing devices may transmit the search results as search results 118A-118C to second control device 106 (as described above). For instance, FIG. 8 shows a step 802 for providing search results from the content providing devices at a second control device, according to an example embodiment. Step 802 may be performed by second control device 106. Step 802 is described as followed.

In step 802, a plurality of search results is received from the content providing devices by a second control device. For example, as shown in FIG. 1, first-third content providing devices 108A-108C each generate search results that are transmitted to, and received by either second control device 106 or control device 102. In an embodiment, search results 118A-118C are transmitted to second control device 106. Second control device 106 is configured to provide all of the received search results to the user on a display of control device 102, a display of television 104, or elsewhere.

Note that control device 102 can be configured in various ways. For instance, FIG. 9 is a perspective view of an example control device 900 in accordance with an embodiment, shown as a remote control. As shown in FIG. 9, control device 900 comprises a housing 902 that includes a top case 904. Top case 904 includes a plurality of apertures via which a variety of user-actuatable control elements of control device 900 are exposed to and rendered manipulable by a user. The user-actuatable control elements of control device 900 include (but are not limited to) a microphone button 912, a home button 914, a back button 916, a menu button 918, a rewind button 920, a play/pause button 922, a fast forward button 924 and a click pad 926.

Control device 900 is shown to illustrate one type of control device, and is not intended to be limiting. Though not shown in FIG. 9, a control device may also include a display screen. FIG. 9 further shows a second control device 906 optionally connected to the control device 900. The connection may be wired or wireless. As previously described, second control device 906 may be a set-top box or another one of first-third content providing devices 108A-108C, a special purpose device, or television 104 itself. In an embodiment, control device 900 may transmit user input to second control device 906. Furthermore, in an embodiment, control device 900 may receive search results from content providing devices 108A-108C through second control device 906.

IV. Example Embodiments with Secondary Control Device as Interface with Content Providing Devices In the prior section, control device 102 (FIG. 1) received search queries and functioned as a communication interface to provide the search query to a plurality of content providing devices. In another embodiment, second control device 106 may be present, and may instead function as the communication interface with the content providing devices.

For example, with reference to FIG. 1, a user may interact with control device 102 to input search query 122, and control device 102 may transmit search query 122 to second control device 106 as search query 114 for handling.

In FIG. 1, control device 102 receives search query 122 (from the user) and may transmit search query 122 as search query 114 to second control device 106. According to embodiments, and described in detail hereinafter, second control device 106 is configured to emulate an interface for communications with each of first-third content providing devices 108A-108C, which may be very different types of devices with correspondingly different communication protocols, to enable search query 122 to be sent to each one. In particular, second control device 106 after receiving search query 122 as search query 114, second control device 106 may transmit search query 114 to each of first-third content providing devices 108A-108C as formatted search queries 116A-116C, respectively, in forms that are compatible with first-third content providing devices 108A-108C. First-third content providing devices 108A-108C each process the received search query against their own catalogs of content to generate search results 118A-118C, respectively. First-third content providing devices 108A-108C transmit search results 118A-118C, respectively, to be received by second control device 106. Second control device 106 is configured to provide each of search results 118A-118C to the user (e.g., on a display of control device 106, transmitted to control device 102 for display, transmitted to television 104 for display, or elsewhere). Search results 118A-118C for the different content providing devices may be provided to the user in various ways, such as being displayed side by side, or by being displayed in a combined manner. Note that in an alternative embodiment, rather than the search results being received and processed by second control device 106, the search results may be alternatively received by second control device 106 and transmitted to control device 102 for processing. Note that in still another embodiment, rather than the search results being received by second control device 106, the search results may be directly received by control device 102.

Figure 10:
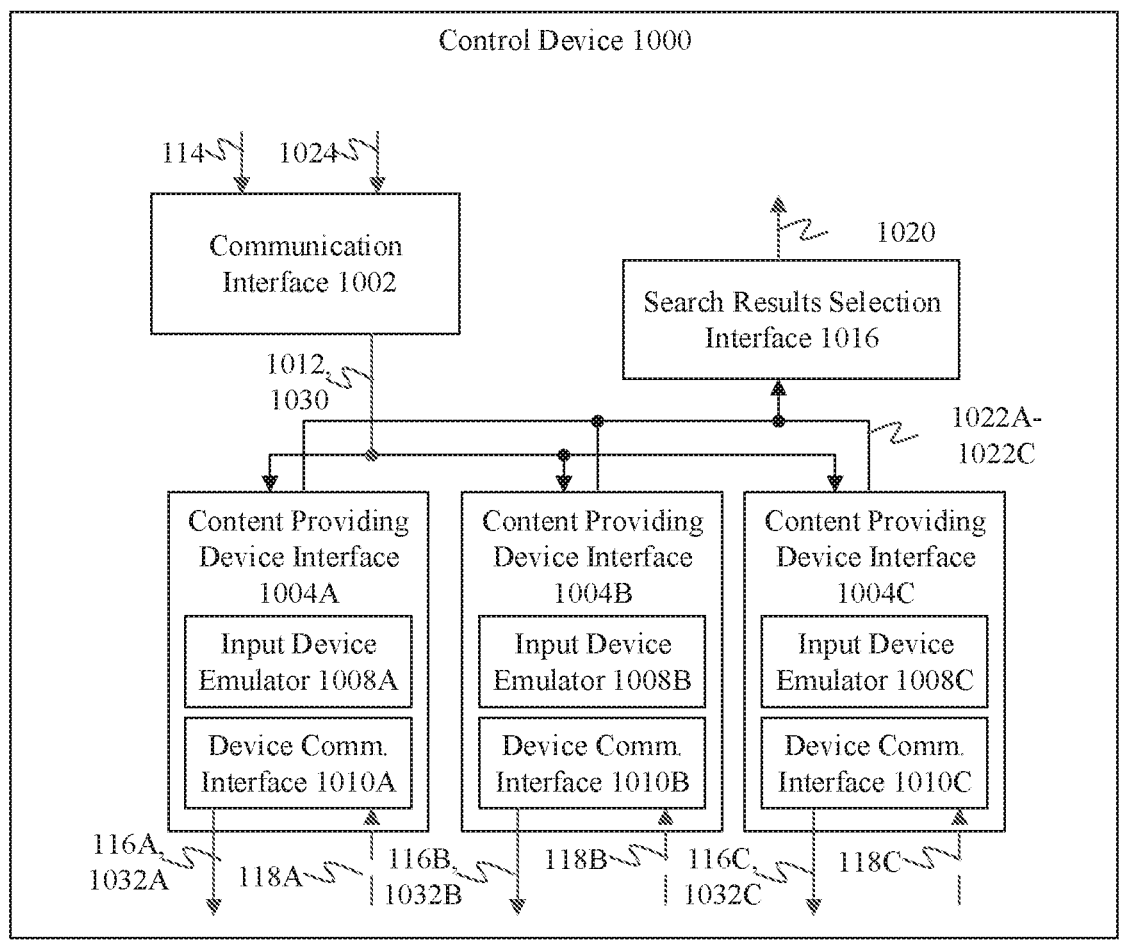
FIG. 10 shows a block diagram of another control device according to an example embodiment.

Second control device 106 may be configured in various ways to perform its functions. For instance, FIG. 10 shows a block diagram of a control device 1000 according to an example embodiment. Control device 1000 is an example of control device 106. As shown in FIG. 10, control device 1000 includes a communication interface 1002, first-third content providing device interfaces 1004A-1004C, and a search results selection interface 1016. First content providing interface 1004A includes an input device emulator 1008A and a device communication interface 1010A. Second content providing device interface 1004B includes an input device emulator 1008B and a device communication interface 1010B. Third content providing device interface 1004C includes an input device emulator 1008C and a device communication interface 1010C. Control device 1000 of FIG. 10 is described as follows.

Communication interface 1002 is configured to enable control device 1000 to receive search query 114 from a handheld control device, such as control device 102 of FIG. 1. For example, communication interface 1002 may be a radio frequency (RF) communication interface (e.g., receiver, a transceiver, etc.), such as a Bluetooth interface, a Wi-Fi interface, an IR (infrared) interface, a proprietary type of communication interface), etc., that enables communications with a corresponding communication interface at the handheld control device. As shown in FIG. 10, communication interface 1002 provides search query 114 to first-third content providing device interfaces 1004A-1004C as search query 1012.

As described further below, first-third content providing device interfaces 1004A-1004C operate substantially similar to first-third content providing device interfaces 204A-204C of FIG. 2 and are each configured as a communication interface with one or more content providing devices (e.g., first-third content providing devices 1084-108C of FIG. 1).

First-third content providing device interfaces 1004A-1004C may each communicate with the content providing devices in a wireless or wired manner. First-third content providing device interfaces 1004A-1004C each enable search queries received by communication interface 1002 to be provided to corresponding content providing devices 1008A-1008C according to a corresponding format/protocol the particular content providing device can handle. Note that although three content providing device interfaces are shown included in control device 1000 in FIG. 10, other numbers of content providing device interfaces may be present, including lesser or greater numbers, depending on the number of different communication techniques desired for communicating with content providing devices.

In particular, input device emulators 1008A-1008C are each configured to emulate a corresponding input device type by formatting search query 1012 according to the corresponding input device type (e.g., a game controller, a wireless keyboard, device-specific remote control, etc.). Input device emulators 1008A-1008C each format search query 1012 such that it appears to the destination content providing device that the formatted search query came from a compatible input device (e.g., a game controller, wireless keyboard, device-specific remote control, etc.). Device communication interfaces 1010A-1010C are each configured to receive the formatted search query from the corresponding one of input device emulators 1008A-1008C, and to transmit the formatted search query to the corresponding one of content providing devices 108A-108C as formatted search queries 116A-116C, respectively. Device communication interfaces 1010A-1010C each transmit respective formatted search queries 116A-116C according to a communication protocol/technique (e.g., Bluetooth, Wi-Fi, proprietary communication protocol/technique, etc.) compatible with the corresponding one of content providing devices 108A-108C.

Furthermore, device communication interface 1010A-1010C are each configured to receive search results 118A-118C from the corresponding one of content providing devices 108A-108C (according to the applicable communication protocol/technique), to extract the search results from the received signal, and to output the extracted search results as search results 1022A-1022C internally to control device 1000 (e.g., all at once, or as they are received by interfaces 1010A-1010C). Search results selection interface 1016 receives search results 1022A-1022C, and provides search results 1022A-1022C to the user of control device 102. For example, search results selection interface 1016 cause the search results to be displayed by a display of control device 1000 (not shown in FIG. 10), and/or may transmit the search results to an electronic visual display to be displayed to a user. In an alternative embodiment, search results selection interface 1016 is configured to transmit search results 1022A-1022C to control device 102 where search results are displayed to the user in display 206 (FIG. 2) of control device 102. Note that in an embodiment, search results selection interface 1016 may include logic configured to organize search results 1022A-1022C, including filtering search results 1022A-1022C (e.g., according to user preferences or selection, or otherwise ordering search results 1022A-1022C (e.g., alphabetically, by content providing device, etc.), condensing search results 1022A-1022C, etc.

Control device 1000 is further configured to receive from the user a selected search result 1024 from the plurality of search results 1020 displayed to the user, as shown in FIG. 10. In particular, and as shown in FIG. 1, the user may interact with control device 102 to input selected search result 1024. In such an embodiment, selected search result is 1024 may be forwarded from control device 102 to second control device 106 through communication interface 1002. Alternatively, selected search result 1024 may be selected by a user interacting with a user interface of control device 1000. Selected search result 1024 may then be forwarded to content providing device interfaces 1004A-1004C as selected search result 1030, and transmitted as one of selected search results 1032A-1032C to the one of content providing device 108A-108C having the content corresponding to selected search result 1024. As a result, the particular content providing device 108A-108C may transmit the selected content to the electronic visual display of television 104 or other device for display to the user.

Figure 11:
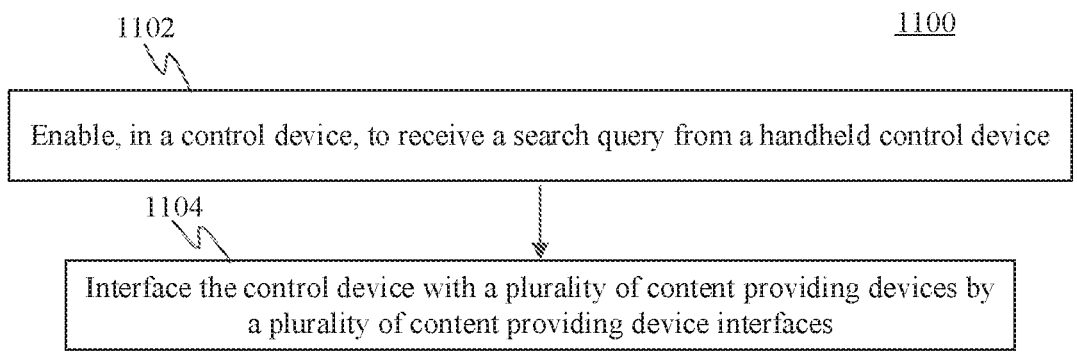
FIG. 11 shows a flowchart for a united search across multiple content providing devices with multiple control devices, according to an example embodiment.

Control device 1000 of FIG. 10 is described in further detail as follows with respect to FIG. 11. FIG. 11 shows a flowchart 1100 for unified search across multiple content providing devices, according to an example embodiment. In an embodiment, control device 1000 of FIG. 10 may operate according to flowchart 1100. Further structural and operational embodiments will be apparent to persons skilled in the relevant art(s) based on the discussion regarding flowchart 1100. Flowchart 1100 is described as follows.

Flowchart 1100 begins with step 1102. In step 1102, a second control device is configured to receive a search query from a handheld control device. For example, as described above, communication interface 1002 of FIG. 10 may receive a search query from first control device 102 of FIG. 1. The search query may include one or more search query term(s) that are inputted by the user to control device 102 in the form of text, voice, and/or other form.

Figure 12:
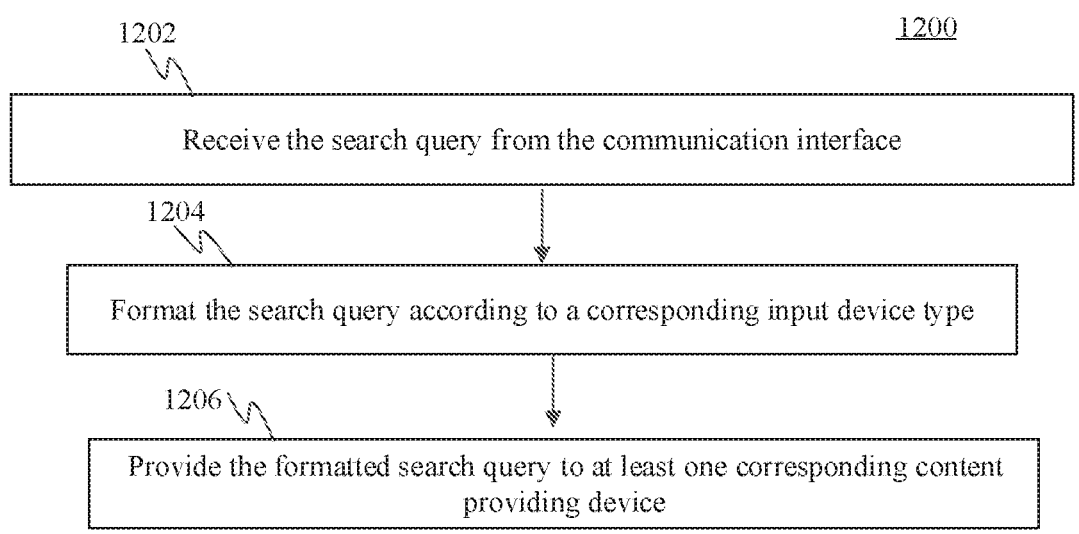
FIG. 12 shows a flowchart for interfacing with a. content providing device, according to an example embodiment.

In step 1104, the second control device is interfaced with a plurality of content providing devices by a plurality of content providing device interfaces. For instance, as described above, first-third content providing device interfaces 1004A-1004C are each configured to interface with one or more content providing devices (e.g., first-third content providing devices 108A-108C of FIG. 1). In an embodiment, the content providing device interfaces may be configured to operate according to FIG. 12. FIG. 12 shows a flowchart 1200 for interfacing with a content providing device, according to an example embodiment. Flowchart 1200 is described as follows.

Flowchart 1200 begins with step 1202. In step 1202, the search query is received from the communication interface. For example, in an embodiment, communication interface 1002 may provide search query 114 as search query 1012 to each of first-third content providing device interfaces 1004A-1004C.

In step 1204, the search query is formatted according to a corresponding input device type. As shown in FIG. 10, each of content providing device interfaces 1004A-1004C includes a corresponding one of input device emulators 1008A-1008C. An input device emulator is configured to emulate a corresponding input device type by formatting search query 1012 according to the corresponding input device type (e.g., a game controller, a wireless keyboard, a mouse pointer, etc.).

For instance, in one example, content providing device interface 1004A may be configured to interface with a Sony® PlayStation®. As such, input device emulator 1008A may be configured to emulate a Bluetooth keyboard, which are allowed to provide textual characters to be provided to a Sony® PlayStation®. Accordingly, input device emulator 1008A may be configured to format search query 1012 according to the corresponding input device type—a Bluetooth keyboard—to generate Bluetooth keyboard formatted text data.

In another example, content providing device interface 1004B may be configured to interface with a Roku®. As such, input device emulator 1008B may be configured to emulate an IP keyboard, which are allowed to provide textual characters to be provided to a Roku® device. Accordingly, input device emulator 1008B may be configured to format search query 1012 according to the corresponding input device type—an IP keyboard—to generate IP keyboard formatted text data.

In step 1206, the formatted search query is provided to at least one corresponding content providing device. As shown in FIG. 10, each of content providing device interfaces 1004A-1004C includes a corresponding one of device communication interfaces 1010A-1010C. A device communication interface is configured to interface with one or more content providing devices, and to provide formatted search query 116A-116C, formatted according to the corresponding input device type, to the corresponding one or more content providing devices as described above.

For instance, in the example where content providing device interface 1004A interfaces with a Sony® PlayStation®, device communication interface 1010A may provide the Bluetooth keyboard formatted text data generated by input device emulator 1008A to a Sony® PlayStation® in video system 100 (e.g., content providing device 108A of FIG. 1) according to a Bluetooth protocol. In the example where content providing device interface 1004B interfaces with a Roku®, device communication interface 1010B may provide the IP keyboard formatted text data generated by input device emulator 1008B to a Roku® in video system 100 (e.g., content providing device 108A of FIG. 1) according to an IP protocol.

Figure 13:
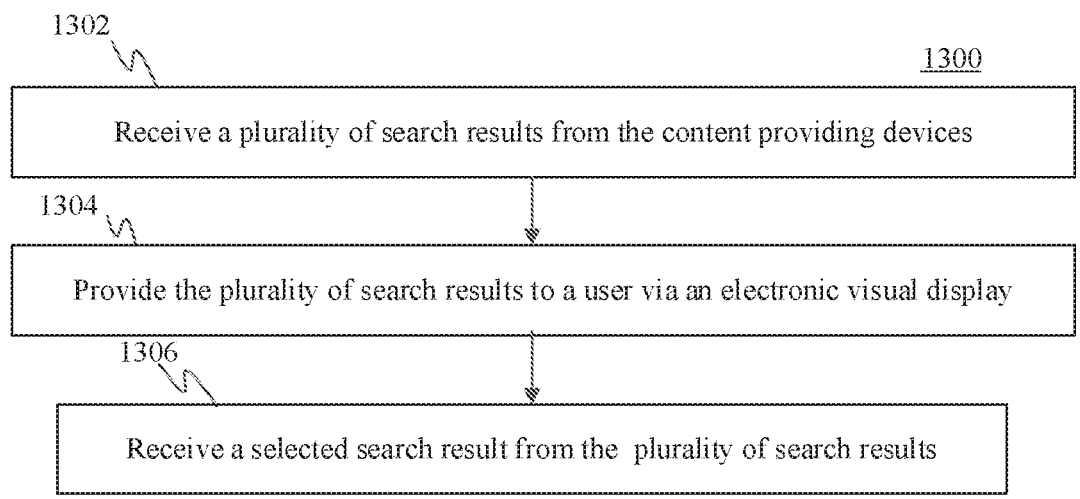
FIG. 13 shows a flowchart for receiving a selection from a user, according to an example embodiment.

After flowchart 1200, the content providing devices in the video system may each process the search query to generate respective search results. For instance, FIG. 13 shows a flowchart 1300 that provides a process receiving search results from content providing devices, according to an example embodiment. Flowchart 1300 may be performed by control device 1000. Flowchart 1300 is described as follows.

Flowchart 1300 begins with step 1302. In step 1302, a plurality of search results from the content providing devices is received. For example, as shown in FIG. 1, first-third content providing devices 108A-108C each generate search results that are transmitted to, and received by control device 102 or second control device 106. With reference to FIG. 10, the search results may be received by the corresponding device communication interfaces 1010A-101C as search results 118A-118C.

In step 1304, the plurality of search results is provided to the user. As shown in FIG. 10 and described above, search results selection interface 1016 of control device 1000, is configured to receive and provide search results 1020 to the user of control device 102 as a collection of search results 1022A-1022C, such as displaying search results 1020 on another electronic visual display, such as television 104. As described above, search results selection interface 1016 may include logic configured to organize the search results, including filtering the search results, ordering the search results, condensing the search results, etc. Any type of organizing may be performed.

For instance, in one embodiment where search results selection interface 1016 organizes search results, each item of content may be listed once, with each content providing device that has the same item of content available for play being indicated next to the content item. For example, the search query entered by the user may be "Star Wars®," which may result in several content providing devices indicating the movie is available for play. However, by listing the content item a single time (instead of once for each content providing device), the user is saved time that would otherwise be spent perusing lengthier search results listing the content item multiple times.

In step 1306, a selected search result is received from the plurality of search results. As shown in FIG. 10 and in an embodiment, communication interface 1002 is configured to receive selected search result 1024 from the user of control device 102 as a selection from search results 1020 (displayed by display 206, television 104, or elsewhere). Selected search result 1024 may be made via a button, via a microphone or any other user interface element.

Figure 14:
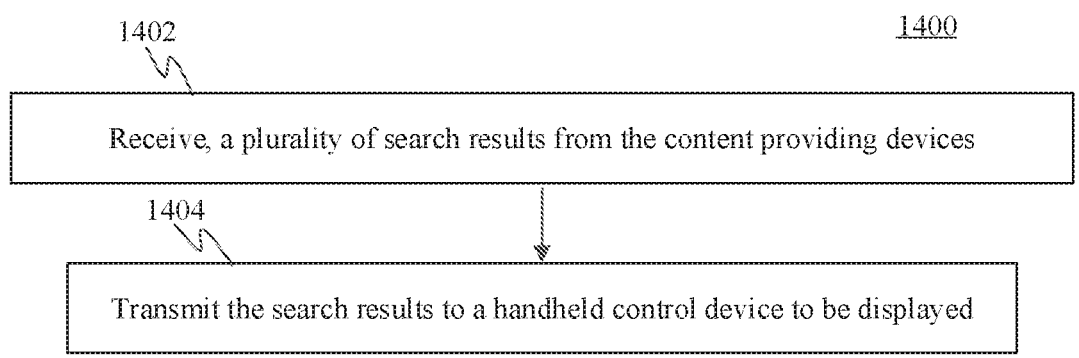
FIG. 14 shows a flowchart for enabling a handheld control device to display search results collected at a stationary control device, according to an example embodiment.

Note that in an embodiment of step 1304 of flowchart 1300, the plurality of search results may be provided to the user at a handheld control device. For instance, FIG. 14 shows a flowchart 1400 for enabling a handheld control device to display search results collected at a stationary control device, according to an example embodiment. Flowchart 1400 may be performed by control device 1000. Flowchart 1400 is described as follows.

Flowchart 1400 begins with step 1402. In step 1402, a plurality of search results is received from the content providing devices. For example, as shown in FIG. 1, first-third content providing devices 108A-108C each generates search results that are transmitted to, and received by second control device 106 or control device 102.

In step 1404, the search results are transmitted to a handheld control device to be displayed. As shown in FIG. 10 and described above, search results selection interface 1016 of control device 1000 may transmit search results 1020 control device 102 via communication interface 1002. Control device 102 may display search results 1020 to the user in display 206.

V. Example Computer System Implementation

Various components of above-described video system may be implemented in hardware, or any combination of hardware with software and/or firmware. For example, various components of the above-described control devices may be implemented as computer program code configured to be executed in one or more processors. In another example, various components of the above-described control devices may be implemented as hardware (e.g., hardware logic/electrical circuitry), or hardware with any combination of hardware with one or both of software (computer program code configured to be executed in one or more processors or processing devices) and/or firmware.

Figure 15:
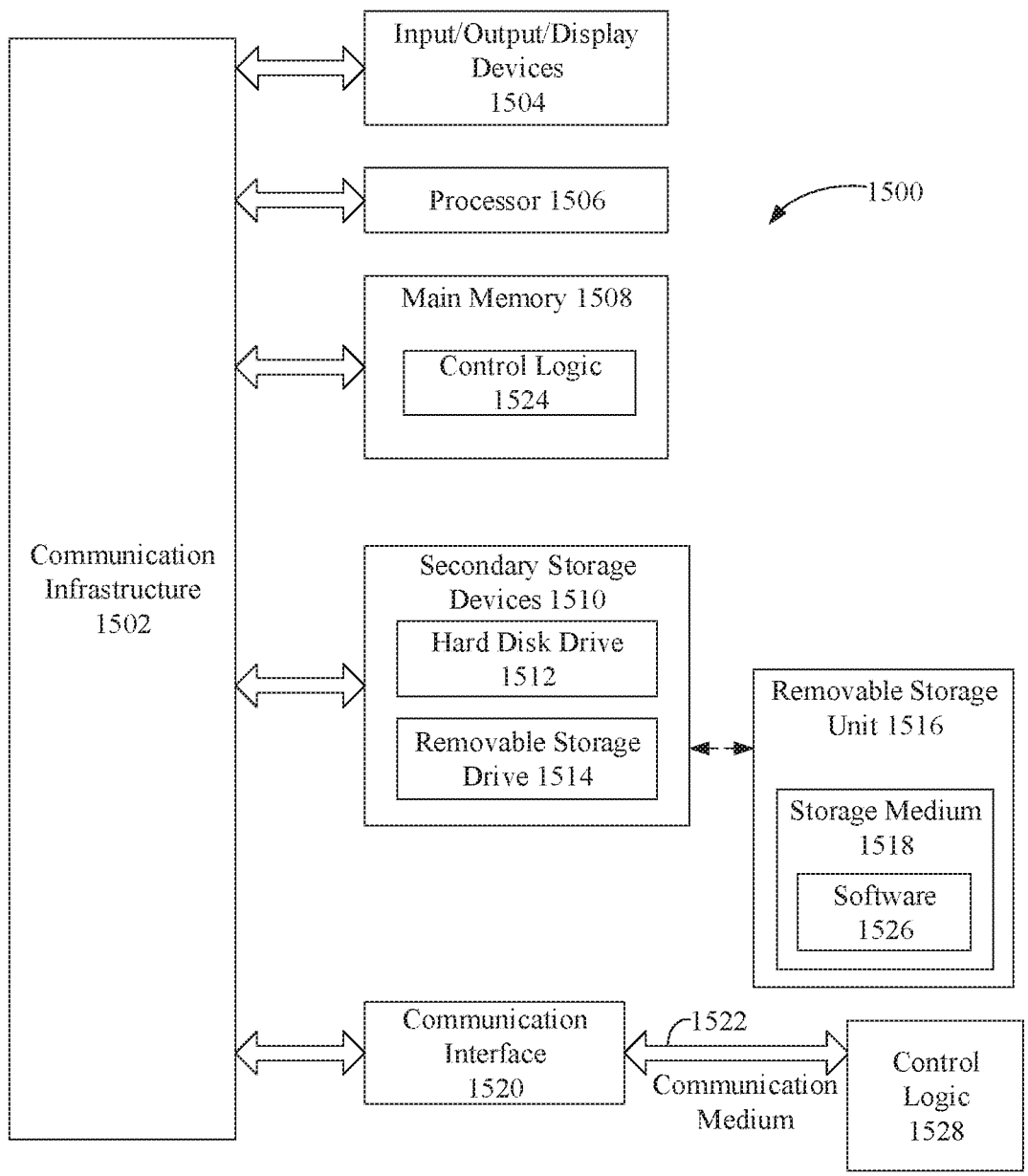
FIG. 15 is a block diagram of an example processor-based system that may be used to implement various embodiments described herein.

The embodiments described herein, including systems, methods/processes, and/or apparatuses, may be implemented using a processor-based computer system, such as computer system 1500 shown in FIG. 15. For example, various components of the above-described video system can each be implemented using one or more computer systems 1500.

System 1500 can be any commercially available and well known computer capable of performing the functions described herein, such as computers available from International Business Machines, Apple, Sun, HP, Dell, Cray, etc. System 1500 may be any type of computer, including a desktop computer, a server, etc.

As shown in FIG. 15, system 1500 includes one or more processors (also called central processing units, or CPUs), such as a processor 1506. Processor 1506 may be used to implement certain elements of the above-described video system; or any portion or combination thereof, for example, though the scope of the embodiments is not limited in this respect. Processor 1506 is connected to a communication infrastructure 1520, such as a communication bus. In some embodiments, processor 1506 can simultaneously operate multiple computing threads.

System 1500 also includes a primary or main memory 1508, such as random access memory (RAM). Main memory 1508 has stored therein control logic 1524 (computer software), and data.

System 800 also includes one or more secondary storage devices 1510. Secondary storage devices 1510 may include, for example, a hard disk drive 1512 and/or a removable storage device or drive 1514, as well as other types of storage devices, such as memory cards and memory sticks. For instance, system 1500 may include an industry standard interface, such a universal serial bus (USB) interface for interfacing with devices such as a memory stick. Removable storage drive 1514 may represent a floppy disk drive, a magnetic tape drive, a compact disk drive, an optical storage device, tape backup, etc.

Removable storage drive 1514 may interact with a removable storage unit 1516. Removable storage unit 1516 includes a computer useable or readable storage medium 1518 having stored therein computer software 1526 (control logic) and/or data. Removable storage unit 1516 represents a floppy disk, magnetic tape, compact disc (CD), digital versatile disc (DVD), Blu-ray™ disc, optical storage disk, memory stick, memory card, or any other computer data storage device. Removable storage drive 1514 reads from and/or writes to removable storage unit 1516 in a well-known manner.

System 1500 also includes input/output/display devices 1504, such as monitors, keyboards, pointing devices, etc.

System 1500 further includes a communication or network interface 1520. Communication interface 1520 enables system 1500 to communicate with remote devices. For example, communication interface 1520 allows system 1500 to communicate over communication networks or mediums 1522 (representing a form of a computer useable or readable medium), such as local area networks (LANs), wide area networks (WANs), the Internet, etc. Communication interface 1520 may interface with remote sites or networks via wired or wireless connections. Examples of communication interface 1522 include but are not limited to a modem, a network interface card (e.g., an Ethernet card), a communication port, a Personal Computer Memory Card International Association (PCMCIA) card, etc.

Control logic 1528 may be transmitted to and from system 1500 via the communication medium 1522.

Any apparatus or manufacture comprising a computer useable or readable medium having control logic (software) stored therein is referred to herein as a computer program product or program storage device, This includes, but is not limited to, system 1500, main memory 1508, secondary storage devices 1510, and removable storage unit 1516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing the elements of the above-described video system and/or further embodiments described herein. Embodiments of the invention are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 15 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

VI. CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method in a control device in a unified search system, comprising:
enabling a user to input a search query by a user input interface; and
interfacing with a plurality of content providing devices by a plurality of content providing device interfaces of the control device, each content providing device external to the control device and corresponding to a content providing device interface of the plurality of content providing device interfaces, each content providing device interface including a corresponding input device emulator of a plurality of different input device emulators, each input device emulator configured to emulate an interface for communications with a corresponding content providing device, each content providing device interface configured to perform:
receiving the search query from the user input interface,
formatting, by the included input device emulator, the search query according to a corresponding input device type and communication protocol, and
providing the search query formatted according to the corresponding input device type to a corresponding content providing device of the plurality of content providing devices.

2. The method of claim 1, further comprising:
receiving a plurality of search results from the content providing devices, and
providing the plurality of search results to the user.

3. The method of claim 2, further comprising:
receiving from the user a selection of a search result from the plurality of search results,
transmitting a request to the content providing devices,
receiving content from the content providing devices, and
transmitting the selected search result to an electronic display.

4. The method of claim 1, wherein a plurality of search results is received from the content providing devices at a second control device of the unified search system that provides the plurality of search results to the user.

5. The method of claim 1, further comprising:
emulating a Bluetooth keyboard with a first content providing device interface of the plurality of content providing device interfaces.

6. The method of claim 1, further comprising:
emulating an Internet protocol (IP) keyboard with a first content providing device interface of the plurality of content providing device interfaces.

7. The method of claim 1, further comprising:
converting a voice command received by the user input interface to a text command; and
transmitting the text command to the content providing devices.

8. The method of claim 1, wherein the control device is a handheld remote control device.

9. A control device in a unified search system, the control device comprising:
a user input interface configured to enable a user to input a search query; and
a plurality of content providing device interfaces configured to interface with a plurality of content providing devices, each content providing device external to the control device and corresponding to a content providing device interface of the plurality of content providing device interfaces, each content providing device interface configured to receive the search query from the user input interface, each content providing device interface including
an input device emulator of a plurality of different input device emulators configured to emulate an interface for communications with a corresponding content providing device, the input device emulator configured to format the search query according to a corresponding input device type and communication protocol, and
a device interface configured to interface with a corresponding at least one content providing device, the device interface configured to provide the search query formatted according to the corresponding input device type to the corresponding at least one content providing device.

10. The control device of claim 9, wherein the control device receives a plurality of search results from the content providing devices; and wherein the control device further includes:
a search results selection interface configured to provide the plurality of search results to the user.

11. The control device of claim 10, wherein the control device further includes:
a search results selection interface configured to allow the user to select a search result from the plurality of search results; and
send content from the selected search result to an electronic visual display.

12. The control device of claim 9, wherein a second control device of the unified search system is configured to receive a plurality of search results from the content providing devices, and to provide the plurality of search results to the user.

13. The control device of claim 9, wherein the plurality of content providing device interfaces includes a first content providing device interface that includes a first input device emulator configured to emulate a Bluetooth keyboard.

14. The control device of claim 9, wherein the plurality of content providing device interfaces includes a first content providing device interface that includes a first input device emulator configured to emulate an Internet protocol (IP) keyboard.

15. The control device of claim 9, wherein the user input interface comprises:
a speech-to-text converter configured to convert a voice command received by the user input interface to a text command; and
wherein the content providing device interfaces are configured to transmit the text command to the content providing devices.

16. The control device of claim 9, wherein the control device is a handheld remote control device.

17. A stationary control device in a unified search system, the stationary control device comprising:
a communication interface configured to enable the stationary control device to receive a search query from a handheld control device; and
a plurality of content providing device interfaces configured to interface with a plurality of content providing devices, each content providing device external to the control device and corresponding to a content providing device interface of the plurality of content providing device interfaces, each content providing device interface including a corresponding input device emulator of a plurality of different input device emulators, each input device emulator configured to emulate an interface for communications with a corresponding content providing device and format the search query according to a corresponding input device type and communication protocol, each content providing device interface configured to receive the search query from the user input interface.

18. The stationary control device of claim 17, wherein:
each content providing device interface further includes a device interface configured to interface with a corresponding at least one content providing device, the device interface configured to provide the search query formatted according to the corresponding input device type to the corresponding at least one content providing device.

19. The stationary control device of claim 17, wherein the stationary control device receives a plurality of search results from the content providing devices; and
wherein the stationary control device further includes:
a search results selection interface that provides the plurality of search results to a user via an electronic visual display; and
wherein the communication interface enables the stationary control device to receive a selection from the plurality of search results.

20. The stationary control device of claim 17, wherein the stationary control device receives a plurality of search results from the content providing devices; and
wherein the stationary control device further includes:
a search results selection interface configured to provide the plurality of search results to the handheld control device.

* * * * *